(12) United States Patent
Takeshita et al.

(10) Patent No.: US 7,964,303 B2
(45) Date of Patent: Jun. 21, 2011

(54) STRUCTURE OF THIN BATTERY COVERED BY OUTER PACKAGING FILM, BATTERY PACK, AND METHOD FOR MANUFACTURING BATTERY PACK

(75) Inventors: Toshio Takeshita, Kanagawa (JP); Hiroaki Sato, Kanagawa (JP); Yoichi Miyajima, Tokyo (JP); Hideyuki Sato, Chiba (JP)

(73) Assignee: Sony Corporation, Tokyo (JP)

( * ) Notice: Subject to any disclaimer, the term of this patent is extended or adjusted under 35 U.S.C. 154(b) by 1139 days.

(21) Appl. No.: 10/966,810

(22) Filed: Oct. 15, 2004

(65) Prior Publication Data

US 2005/0112415 A1 May 26, 2005

(30) Foreign Application Priority Data

Oct. 17, 2003 (JP) .............................. P2003-357471
Sep. 29, 2004 (JP) .............................. P2004-284263

(51) Int. Cl.
*H01M 2/00* (2006.01)
*H01M 6/46* (2006.01)
*H01M 2/02* (2006.01)

(52) U.S. Cl. ......... 429/163; 429/162; 429/170; 429/178

(58) Field of Classification Search .................. None
See application file for complete search history.

(56) References Cited

U.S. PATENT DOCUMENTS

| | | | | |
|---|---|---|---|---|
| 5,399,445 A | * | 3/1995 | Tinker | 429/90 |
| 6,492,058 B1 | * | 12/2002 | Watanabe et al. | 429/121 |
| 2002/0071986 A1 | * | 6/2002 | Exnar | 429/94 |
| 2002/0142195 A1 | * | 10/2002 | Ehara | 429/7 |
| 2002/0150815 A1 | * | 10/2002 | Ehara | 429/90 |
| 2003/0003357 A1 | * | 1/2003 | Tamai et al. | 429/181 |
| 2003/0077486 A1 | * | 4/2003 | Iwaizono et al. | 429/7 |
| 2003/0165736 A1 | | 9/2003 | Hiratsuka | |
| 2003/0173709 A1 | | 9/2003 | Iwaizono et al. | |
| 2003/0180582 A1 | * | 9/2003 | Masumoto et al. | 429/7 |
| 2004/0126651 A1 | * | 7/2004 | Kim et al. | 429/61 |

FOREIGN PATENT DOCUMENTS

JP            11170069        *   6/1999

(Continued)

OTHER PUBLICATIONS

IPDL JPO Machine Translation for Haraguchi et al., JP 11-170069 (Jun. 1999).*

(Continued)

*Primary Examiner* — Dah-Wei D Yuan
*Assistant Examiner* — Adam A Arciero
(74) *Attorney, Agent, or Firm* — Frommer Lawrence & Haug LLP; William S. Frommer; Ellen Marcie Emas (57) ABSTRACT

To provide a thinner, lighter battery pack and to reduce the cost by eliminating the need for a battery case. A thin battery pack structure using an outer packaging film (battery pack) is constructed by a flat and rectangular shaped battery cell, a flat and rectangular shaped frame portion accommodating the battery cell, a circuit board unit disposed on the outer side surface of the frame portion, a cap portion mounted on one ends of the frame portion and the battery cell so as to sandwich the circuit board unit with the outer side surface of the frame portion, and an outer packaging film for integrally covering the rectangular battery cell and the frame portion.

19 Claims, 9 Drawing Sheets

FOREIGN PATENT DOCUMENTS

JP        2002-110121      4/2002
JP        A 2003-59468     2/2003

OTHER PUBLICATIONS

Merriam-Webster Online Dictionary, "Sandwich" (transitive verb), definition #2, http://www.merriam-webster.com/dictionary/sandwich.*

Merriam-Webster Online Dictionary, "Sandwich" (transitive verb), definition #2, http://www.merriam-webster.com/dictionary/sandwich (No Date Available).*

JP 53 044843 A (Suwa Seikosha KK) Apr. 22, 1978 Derwent abstract. Retrieved from Internet, EPOQUE Database, on Sep. 6, 2005.

JP 53-044835 A (Suwa Seikosha KK) Apr. 22, 1978 Derwent abstract. Retrieved from Internet, EPOQUE Database, on Sep. 6, 2005.

JP 52-132336 A (Toshiba Ray O. Vac Co.) Nov. 7, 1977 Derwent abstract. Retrieved from Internet, EPOQUE Database, on Sep. 6, 2005.

JP 02 204959 A (Fuji Electrochem Co. Ltd) Aug. 14, 1990 Patent abstract of Japan.

Japanese Office Action dated Feb. 23, 2010.

European search report dated Nov. 2, 2010.

* cited by examiner

STRUCTURE OF THIN BATTERY COVERED BY OUTER PACKAGING FILM, BATTERY PACK, AND METHOD FOR MANUFACTURING BATTERY PACK

BACKGROUND OF THE INVENTION

1. Field of the Invention

The present invention relates to a structure of a thin battery covered by an outer packaging film, a battery pack, and method for manufacturing a battery pack to be used for a battery of a mobile phone, a game machine, a notebook-type personal computer, or the like.

2. Description of Related Art

Figure 10:
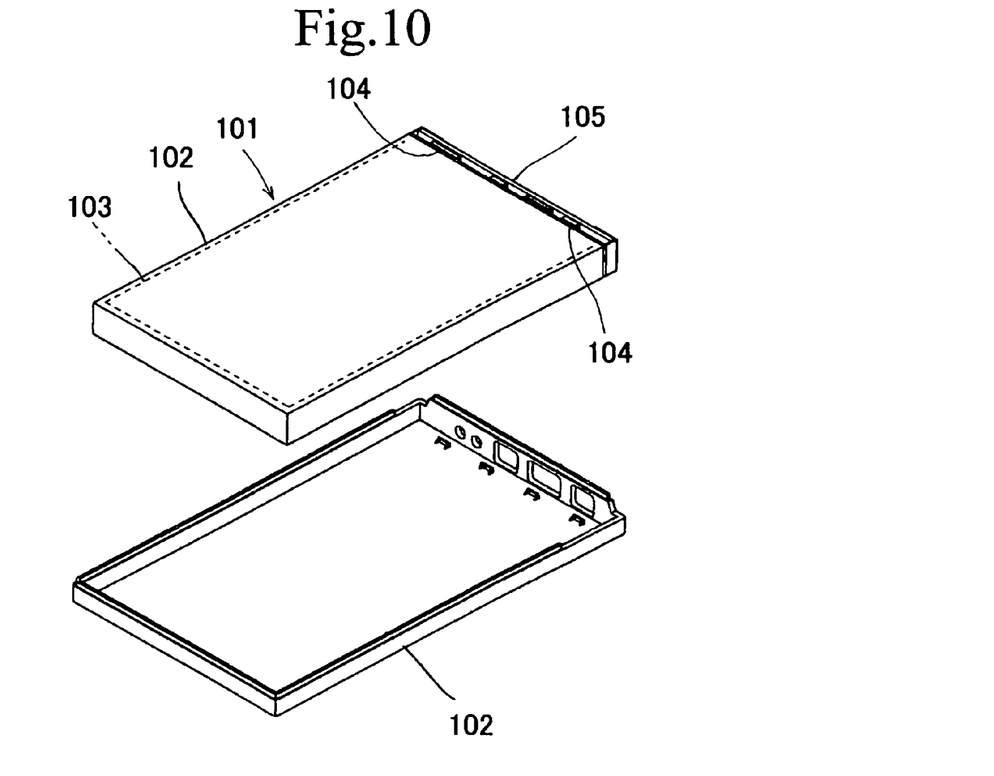
FIG. 10 is a perspective view of a conventional embodiment.
Figure 11:
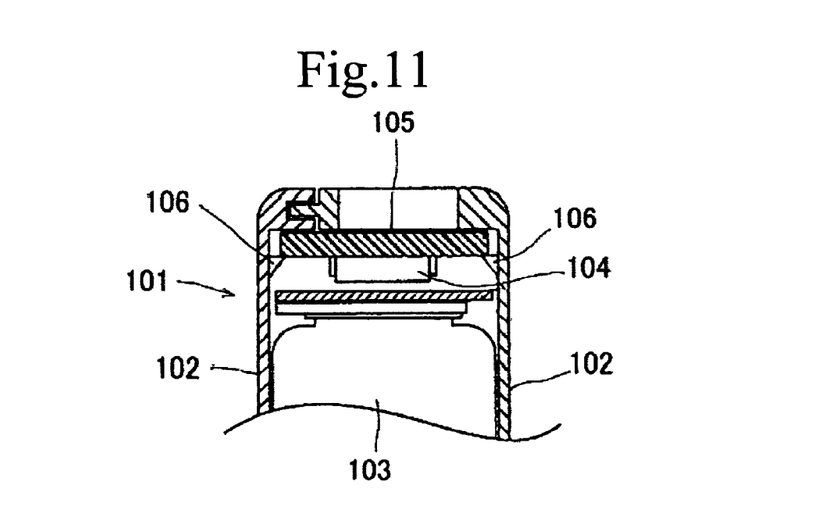
FIG. 11 is a cross-sectional view of a conventional embodiment.
Figure 12:
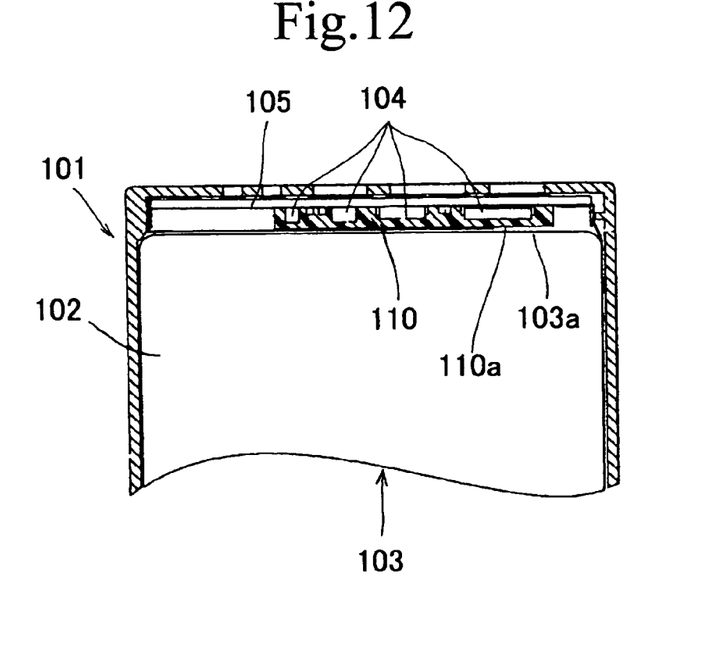
FIG. 12 is a cross-sectional view of a conventional embodiment.

As a battery structure and a battery pack, the one as shown in FIG. 10 is known. A battery pack 101 is constructed of a rectangular battery main body (referred to as a "battery cell" below) 103 containing power generation elements therein, and a circuit board unit 105 on which a plurality of electronic components 104 is mounted to constitute a protection circuit, which are accommodated in a battery case 102 constituted by two halves of a thin box. It is to be noted that, as shown in FIG. 11, the circuit board unit 105 is supported by ribs 106 formed on the battery case 102 so that the electronic components 104 do not contact the battery cell 103. As shown in FIG. 12, it has been also known a battery pack that eliminates the need for the ribs 106 in such a manner that a mold resin layer (referred to as a "transfer mold" below) 110 for molding the electronic components 104 is formed, a flat surface 110a at the end of the mold resin layer 110 is made to contact with a flat surface 103a of the battery cell 103, and they are accommodated in the battery case. (see, for example, Patent Document 1: Japanese Patent Application Publication No. 2002-110121 (in paragraphs [0003] and [0006], FIG. 2, FIG. 5, FIG. 6 and the like.))

The conventional battery pack 101 as described above has, however, the following drawbacks.

(1) Since the conventional battery pack 101 is constructed to accommodate the rectangular battery cell 103, and the circuit board unit 105 on which a plurality of electronic components 104 is mounted to constitute a protection circuit in the battery case 102 constituted by two halves of a thin box, the battery pack 101 becomes thick, bulky and heavyweight. Further, its cost is also high. In particular, the battery cell 103 tends to increase its thickness by swelling at the center portion thereof at the time of charging or in high temperature. It is therefore required to design the size of the battery case 102 with taking the inflation of swelling the battery cell 103 into consideration, thereby requiring a space between the battery case 102 and the battery cell 103 for absorbing such inflation. This makes the battery case 102 relatively large and is usually a cause of volume ratio deterioration of the battery cell 103 in the battery pack 101.

(2) In case of eliminating the need for the ribs 106 by contacting a flat surface 110a at the end of the transfer mold 110 molding and protecting the electronic components 104 with a flat surface 103a of the battery cell 103, there causes more or less adverse effects on the electronic components 104 or the like if the transfer mold 110 is pressed hard onto the battery cell 103.

SUMMARY OF THE INVENTION

The present invention provides a thinner, smaller and lighter battery pack and reduces the cost by eliminating the need for a battery case constituted by two halves of a thin box. Another aspect of the present invention is to prevent the transfer mold from pressing onto the battery cell, thereby protecting the electronic components.

A first aspect of the present invention is to eliminate the need for the conventional two halves of the battery case in such manner that a thin battery is constructed of a battery cell formed in a flat and rectangular shape, a frame portion in which the battery cell is accommodated, a circuit board unit disposed on an outer side surface of the frame portion, a cap portion mounted so as to sandwich the circuit board unit with the outer side surface of the frame portion at one ends of the frame portion and the battery cell, and an outer packaging film integrally covering the battery cell and the frame portion, wherein the side surfaces of the battery cell is enclosed by the frame portion, and the front and back surfaces of the battery cell are covered with the outer packaging film.

In a second aspect of the present invention, areas (wrapped portion), including both the frame portion and the cap portion, where the outer packaging film is wrapped are formed to be thinner relative to a height of an area (not wrapped portion) where the outer packaging film is not wrapped by an amount corresponding to the thickness of the outer packaging film, and at least one of the outer surfaces of the frame portion is formed to be higher than a side surface of the battery cell.

In a third aspect of the present invention, the thin battery of the first aspect is formed in such manner that a cell's positive pole portion fitting window is provided on one side of the frame portion to fit with the cell's positive pole portion projecting from the side surface of the battery cell, and a circuit board unit mounting portion is provided on the outer surface of the side of the frame portion.

In a forth aspect of the present invention, the thin battery of the third aspect is formed in such manner that the cap portion has a rectangular end surface portion for sandwiching the circuit board unit mounted on the mounting portion with the frame portion, and a tubular portion which is formed continuously with the rectangular end surface portion and has a fitting portion to be fitted to the outer circumference portion of one ends of the frame portion and the battery cell, and further a hollow portion is provided at one of corner portion formed by the end surface portion and the tubular portion.

In a fifth aspect of the present invention, the thin battery of the first aspect is formed in such manner that a terminal contact portion exposing the outside through a terminal window is provided on the end surface portion of the cap portion, electronic components and a transfer mold for molding the electronic components are provided on the inner surface facing to the frame portion, and the frame portion has protrusions formed on the surface facing to the circuit board unit and projecting toward the circuit board unit side, wherein the circuit board unit is assembled and fixed so as to be sandwiched between the frame portion and the cap portion so that a predetermined gap (small gap) is derived between the end of the transfer mold and the frame portion.

In the sixth aspect of the present invention, a battery pack being formed to be flat and rectangular shaped and having a first surface including a terminal contact portion and orthogonal to a main surface, a second surface opposite to the first surface, a first side surface orthogonal to the main surface, and a second side surface opposite to the first side surface, comprises a circuit board unit constructing the terminal contact portion, a cap portion including the first surface having a terminal window capable of exposing the terminal contact portion to outside, and a tubular portion continuing with the first surface, a flat and rectangular shaped battery cell, a frame portion in which a position where a main surface portion of a battery cell is facing is opened, and including four side surfaces orthogonal to the main surface portion, wherein one surface is the second surface and outer packaging film integrally covering the battery cell and the frame portion.

In the seventh aspect of the battery pack according to the sixth aspect of the present invention, areas including both the frame portion and the cap portion where the outer packaging film is wrapped are formed to be thinner relative to a height of an area where the outer packaging film is not wrapped by an amount corresponding to the thickness of the outer packaging film.

In the eighth aspect of the battery pack according to the sixth aspect of the present invention, at least one of the outer surfaces of the frame portion is formed to be higher than a side surface of the battery cell.

In the ninth aspect of the battery pack according to the sixth aspect of the present invention, one end portion of the circuit board unit is connected to the other end portion of a positive pole tab in which one end portion of the positive pole tab is connected a cell positive pole portion of the battery cell, the other end portion of the circuit board unit is connected to one end portion of an negative pole tab, the other end portion of the negative pole tab and the other end portion of the PTC tab in which one end thereof is connected to a cell negative pole portion are connected with a welded portion, and the welded portion is provided at one of the first side surface and the second side surface.

In the tenth aspect of the battery pack according to the ninth aspect of the present invention, the welded portion is located inner side of a cutout portion provided at a side surface of the frame portion.

In the eleventh aspect of the battery pack according to the ninth aspect of the present invention, the positive pole tab is formed to be L-shaped, in which a longer side thereof is connected to the cell positive pole portion of the battery cell and a shorter side thereof is connected to the one end of the circuit board unit.

In the twelfth aspect of the battery pack according to the ninth aspect of the present invention, the positive pole tab is formed with a metal plate to which a annealing treatment is performed.

In the thirteenth aspect of the battery pack according to the ninth aspect of the present invention, the negative pole tab is formed to be L-shaped, in which a shorter side thereof is connected to the other end portion of the circuit board unit.

In the fourteenth aspect of the battery pack according to the tenth aspect of the present invention, the other end of the PTC tab in which on end portion thereof is welded to the cell negative pole portion of the battery cell and end portion of the longer side of the negative pole tab in which the shorter side is connected to the other end portion of the circuit board unit are overlapped at the cutout portion.

In the fifteenth aspect of the battery pack according to the fourteenth aspect of the present invention, the longer side of the negative pole tab is inserted into the frame portion through a slit provided at the side surface of the frame and is overlapped with the PTC tab within the cutout portion.

In the sixteenth aspect of the battery pack according to the sixth aspect of the present invention, a cap support portion to be inserted within the tubular portion of the cap portion is provided at the frame portion, and the cap portion is attached to the frame portion by inserting the cap support portion within the tubular portion of the cap portion.

In the seventeenth aspect of the battery pack according to the sixteenth aspect of the present invention, a cap portion engaging pawl and a pawl engaging hole are provided at the cap support portion and the tubular portion of the cap portion, and the cap portion engaging pawl and the pawl engaging hole engages to each other when the cap support portion is inserted within the tubular portion of the cap portion.

The eighteenth aspect of the present invention is a fabrication method of a battery pack comprises a cell accommodating step for accommodating battery cell formed in a flat and rectangular shape in a rectangular frame, a circuit board unit connecting step for connecting a circuit board unit having a terminal connecting portion to the battery cell, a cap portion mounting step for mounting a cap portion to the frame portion, and an outer packaging film covering step for covering the frame portion accommodating the battery cell by an outer packaging film.

In the nineteenth aspect of the fabrication method according to the eighteenth aspect of the present invention, the circuit board unit connecting step includes a step for providing a positive pole tab along with the end surface of the frame portion for the battery cell while connecting one end side of the positive pole tab to a cell positive pole portion of the battery cell, a step for connecting the other end side of the positive pole tab to one end side of the circuit board unit, a step for providing an negative pole tab along with the side surface of the battery cell while connecting one end side of the negative pole tab to the other end side of the circuit board unit, a step for providing a PTC tab along with the side surface of the battery cell while connecting one end portion of the PTC tab to the cell negative pole portion of the battery cell and a tab welding step for welding the PTC tab and the end portion of the cell negative pole portion while overlapping to each other.

In the twentieth aspect of the fabrication method according to the nineteenth aspect of the present invention, the step for connecting one end side of the positive pole tab to a cell positive pole portion of the battery cell includes a step for connecting a longer side of the positive pole tab and a cell positive pole portion of the of the battery cell in which the positive pole tab is made of a metal plate to which an anneal treatment is performed and is formed to be L-shaped, and a step for connecting a shorter side of the L-shaped positive pole tab to the circuit board unit.

In the twenty-first aspect of the fabrication method according to the twentieth aspect of the present invention, the step for connecting one end side of the negative pole tab to the other end side of the circuit board unit connects the shorter side to the other end portion of the circuit board unit while flattening the longer side of the L-shaped negative pole tab in parallel with the longer side of the positive pole tab.

In the twenty-second aspect of the fabrication method according to the twenty-first aspect of the present invention, the longer side of the L-shaped negative pole tab is inserted within the frame portion through a slit provided on the side surface of the frame portion in which the shorter side of the negative pole tab is connected to the circuit board unit and is overlapped with the end portion of the PTC tab at the side surface of the battery cell, and this overlapping portion is welded in the tab welding step.

In the twenty-third aspect of the fabrication method according to the twenty-second aspect of the present invention, the welding step for the PTC tab and the negative pole tab is performed through a cutout portion provided at a side surface of the frame portion.

The battery pack according to the present invention exhibits the following advantages.

(1) The battery pack in the first aspect features that the outer packaging body of the battery pack is constructed of the frame portion, the cap portion and the outer packaging film instead of using the battery case constituted by two halves of a thin box, thereby while suppressing tolerance in the outer measurement, achieving the thinner, smaller and lighter battery pack and also reducing the cost.

Particularly, areas (wrapped portion), including both the frame portion and the cap portion, where the outer packaging film is wrapped are formed to be thinner relative to a height of an area (not wrapped portion) where the outer packaging film is not wrapped by an amount corresponding to the thickness of the outer packaging film, and the outer packaging film wrapped area and the outer packaging film un-wrapped area are flash with each other, so that it is prevented to have a step there.

The battery pack of the present invention is capable of restricting the thickness of the accommodated battery cell within the height range of the frame portion and the cap portion, even in the most inflated condition during charging or in high temperature, thereby maintaining the thickness of the battery pack to a constant value.

The battery pack of the present invention is capable of combining the battery cell and the frame portion by engaging the cell's positive pole portion of the battery cell with the cell's positive pole engaging window of the frame portion when the battery cell is accommodated in the frame portion. Also, the end of the cell's positive pole portion is made to face through the outer surface on one side of the frame portion, thereby making it easy to establish the electrical connection with the circuit board unit which is to be mounted on the mounting portion at the outer surface of the one side of the frame portion.

The battery pack of the present invention is capable of preventing the frame portion and the battery cell from separating, by fitting the cap portion into the circumference at one ends of the frame portion and the battery cell so as to integrate the frame portion and the battery cell with the cap portion. Additionally, since the positive pole portion on the side surface of the battery cell is covered with the cap portion, the positive pole portion is prevented from being exposed even if the outer packaging film may be peeled off by mistake, thereby maintaining the safety.

The battery pack of the present invention normally maintains non-contacting condition between the transfer mold of the circuit board unit and the frame portion, with a predetermined distance. However, in the case when the terminal contact portions of the circuit board unit are pressed toward the frame portion as a result of pressure by the corresponding terminals, while the end portion of the transfer mold is pressed against the outer side surface of the frame portion, the transfer mold is prevented from being strongly pressed against the frame portion because the circuit board unit is pressed against the protrusions provided on the frame portion.

(2) The battery pack of the present invention is configured to have an outer packaging body by covering the rectangular shaped battery cell and the frame portion with an outer packaging film, so that it is able to perform thinning, downsizing, and light-weighting of the battery pack as well as the cost reduction. Particularly, the outer packaging film wrapped area (where the outer packaging film is wrapped) and the outer packaging film un-wrapped area (where the outer packaging film is not wrapped) are flash with each other, so that it is prevented to have a step there by the wrapping of the outer packaging film on surfaces of the battery pack.

Further, the height of the second end surface of the frame portion is formed to be higher than the side surface of the battery cell, so that even the battery cell is inflated during charging or in high temperature, it becomes possible to absorb the inflation of the battery cell by the difference of the height.

Further, welding portion of the negative pole tab and the PTC tab is provided at either the first side surface or the second side surface, so that it becomes possible to carry out welding of the both. Particularly, a cutout portion is provided at a side surface of the frame portion opposing to the welding portion, so that it becomes possible to weld the negative pole tab and the PTC tab through the cutout.

The positive pole tab is formed to be L-shaped, in which a longer side thereof is connected to the cell positive pole portion of the battery cell and a shorter side thereof is connected to the one end of the circuit board unit, so that it is possible to overlap the circuit board unit and the end surface of the frame portion by bending the shorter side of the positive pole tab by approximately a right angle. Particularly, the positive pole tab is formed with a metal plate to which a annealing treatment is performed so that it becomes easy to bend the positive pole tab and to suppress occurrence of the restoring force at the bent portion.

Further, the negative pole tab is formed to be L-shaped, in which a shorter side thereof is connected to the other end portion of the circuit board unit, and the longer side is extended at a right angle from the other end portion of the circuit board unit, so that the longer side of the negative pole tab automatically aligned with the side surface of the battery cell by overlapping the circuit board unit and the end surface of the battery cell. Particularly, a slit is provided at the side surface of the frame portion, so that the longer side of the negative pole portion can be overlapped with the PTC tab at the cutout portion by inserting the longer side of the negative pole portion into the frame portion through the slit.

Further, it is possible to easily mount a cap portion to the frame portion by inserting a cap support portion provided at the frame portion within a tubular portion of the cap portion. Particularly, a cap portion engaging pawl and a pawl engaging hole are provided at the cap support portion and the tubular portion of the cap portion, so that it is possible to prevent dropout of the cap portion from the frame portion.

(3) A fabrication method of a battery pack of the present invention comprises a cell accommodating step for accommodating battery cell formed in a flat and rectangular shape in a rectangular frame, a circuit board unit connecting step for connecting a circuit board unit having a terminal connecting portion to the battery cell, a cap portion mounting step for mounting a cap portion to the frame portion, and an outer packaging film covering step for covering the frame portion accommodating the battery cell by an outer packaging film, so that it becomes possible to fabricate a light-weighted and thin battery pack by integrating the frame portion, the battery cell, and the cap portion.

Particularly, the positive pole tab, the negative pole tab, and the PTC tab are provided along with the side surface of the battery call, and the wilding of the negative pole tab and the PTC tab is performed at the side surface of the battery cell, so that it becomes easy to carry out the connection work of the circuit board unit.

In addition, the positive pole tab is made of a metal plate to which an anneal treatment is performed and is formed to be L-shaped, wherein the longer side thereof is connected to cell positive pole portion, and a cell positive pole portion of the of the battery cell, the shorter side thereof is connected to the one end portion of the circuit board unit, so that it is possible to overlap the circuit board unit and the end surface of the frame portion by bending the positive pole tab at a bended portion between the longer side and the shorter side by approximately a right angle.

The negative pole tab is formed to be L-shape in advance, and the shorter side of the negative pole tab is connected to the other end side of the circuit board unit while flattening the longer side of the L-shaped negative pole tab in parallel with the longer side of the positive pole tab, so that when the circuit board unit is overlapped with the end surface side (the longer side of the positive pole tab) of the frame portion by bending the shorter side of the positive pole tab by approximately a right angle, the longer side of the negative pole tab is overlapped with a side surface side of the battery cell.

particularly, the a tip of the longer side of the negative pole tab is inserted into the frame portion through a slit provided at the side surface of the frame portion, the end portion of the longer side of the negative pole tab is overlapped with the end portion of the PTC tab inside of the frame portion, and the overlapped portion is welded through a cutout provided at the side surface of the frame portion, so that the it is easily perform the welding work.

DESCRIPTION OF THE PREFERRED EMBODIMENTS

Figure 1:
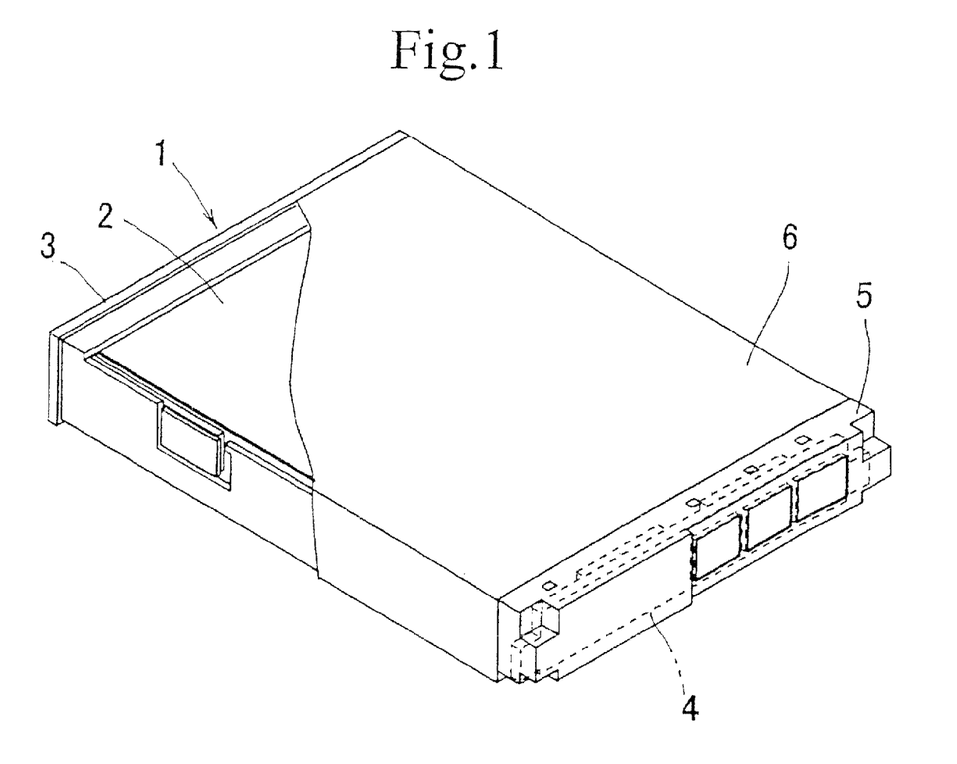
FIG. 1 is a perspective view of a structure of a thin battery covered by an outer packaging film.
Figure 2:
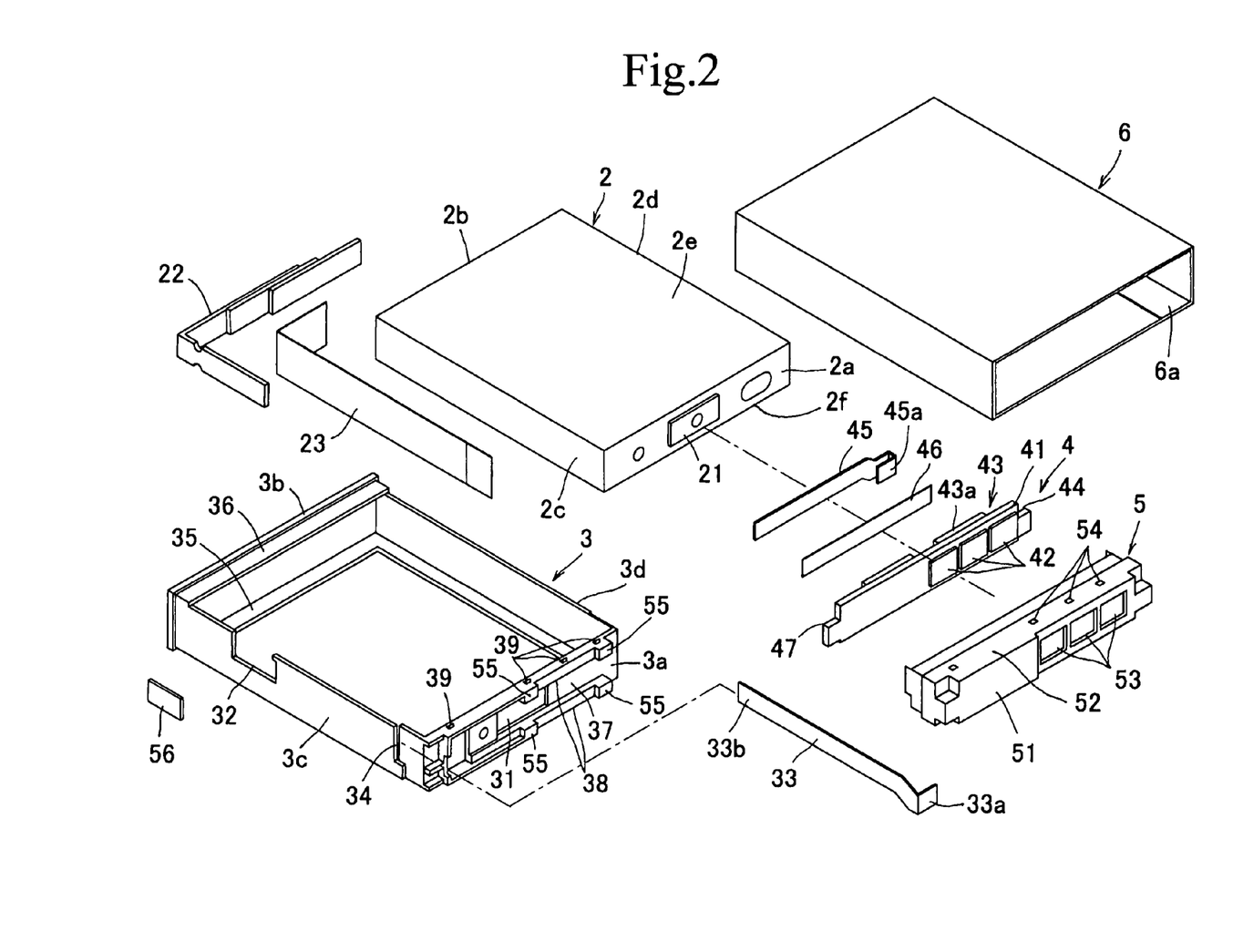
FIG. 2 is an exploded perspective view of a structure of a thin battery covered by an outer packaging film.

FIG. 1 is a perspective view of a battery pack 1 and FIG. 2 is an exploded perspective view of the battery pack 1. As shown in FIG. 1, the battery pack 1 has a rectangular battery cell 2, a rectangular frame portion 3 containing the battery cell 2, a circuit board unit 4 disposed on the outer side surface of the frame portion 3, a cap portion 5 mounted on one ends of the frame portion 3 and the battery cell 2 so as to sandwich the circuit board unit 4 with the outer side surface of the frame portion 3, and an outer packaging film 6 integrally covering the rectangular battery cell 2 and the frame portion 3.

The battery cell 2 is formed by covering a laminated member (battery element), which is made, for example, by sequentially laminating a positive pole, a separator and a negative pole, with a film-like outer packaging member. As shown in FIG. 2, the battery cell 2 is formed in a flat rectangular tubular form with first to fourth side surfaces 2a to 2d and a front surface 2e and a reverse surface 2f. A cell's positive pole portion 21 is formed so as to project from the surface at substantially center portion on the first side surface 2a, while a cell's negative pole portion (not shown) is formed at the center portion on the second surface 2b which is opposite side to the first side surface 2a. To the cell's negative pole portion, one end of a positive temperature coefficient thermistor (referred to as "PTC" below) tab 22 is connected as a safety component for making the negative pole portion to be non-conductive at the time of high temperature. The other end of the PTC tab 22 extends to the third side surface 2c of the battery cell 2. A sheet of insulating paper 23 is interposed between the third side surface 2c of the battery cell 2 and the PTC tab 22.

The frame portion 3 is made from insulating synthetic resin in a rectangular frame portion, and its first to fourth sides 3a to 3d can be overlapped on the first to fourth side surfaces 2a to 2d of the battery cell 2.

On the first side 3a of the frame portion 3 which overlaps on the first side surface 2a of the battery cell 2, a cell's positive pole portion fitting window 31 is formed for fitting with the cell's positive pole portion 21. On the third side 3c which overlaps on the third side surface 2c of the battery cell 2, a window 32 through which the end portion of the PTC tab 22 faces is formed. A slit 34 for inserting a negative pole tab 33 inside the third side 3c is provided to the end portion of the first side 3a.

A flange-like projection 35 for supporting the bottom of the battery cell 2 is provided at the bottom of the frame portion 3. In addition, at the top of the frame portion 3, a flange-like projection 36 is formed in opposed relationship with the flange-like projection 35 along the upper edge of the second side 3b. The end portion of the second side surface 2b of the battery cell 2 is sandwiched between these flange-like projections 35, 36.

The height of the second side 3b of the frame portion 3 is formed substantially equal to the most inflated height (thickness) of the accommodated battery cell 3 in the condition at the time of charging or in a high temperature.

A circuit board unit mounting portion 37 is provided on the outer surface of the first side 3a of the frame portion 3. The circuit board unit mounting portion 37 is formed between a pair of cap portion supporting portions 38, 38 projecting from upper and lower ends on the outer surface of the first side 3a of the frame portion 3. On the cap portion supporting portions 38, 38, a plurality of cap engaging claws 39 are formed.

The circuit board unit 4 has a base plate 41 made from insulating synthetic resin such as glass epoxy-phenol and a plurality of terminal contact portions 42 formed on the outer surface of the base plate 41. Electronic components and a transfer mold 43 that molds the electronic components are provided on the inner surface of the base plate 41. The circuit board unit 4 is assembled and fixed in the condition to be sandwiched between the frame portion 3 and the cap portion 5 with a predetermined (small) gap between the end of the transfer mold 43 and the frame portion 3. One end 45a of a positive pole tab 45 is connected by welding to a terminal portion 44 at one end of the circuit board unit 4. The other end of the positive pole tab 45 is connected by welding to a cell's positive pole portion 21 of the battery cell 2. An insulating paper 46 is interposed between the circuit board unit 4 and the positive pole tab 45.

Furthermore, one end 33a of a negative pole tab 33 is connected by welding to the other terminal portion 47 at the other end of the circuit board unit 4. The positive pole tab 45 is formed with a metal plate such as a nickel plate in a L-shape. A so-called annealing treatment is performed on the metal plate to be used for ease of bending. In the above mentioned L-shaped positive pole tab 45, a longer side thereof is connected by welding to the cell's positive pole portion 21 of the battery cell 2, and a shorter side thereof is connected to a terminal 44 at one end of the circuit board unit 4.

The negative pole tab 33 is also formed with a metal plate such as a nickel plate in a L-shape like the positive pole tab 45. In the above mentioned L-shaped negative pole tab 33, one end 33a of a shorter side thereof is connected to a terminal 47 of the other end of the circuit board unit 4. The other end 33b of a longer side of the negative pole tab 33 is inserted into the frame portion 3 through the slit 34 formed in the third side 3c of the frame portion 3 for making connection to the PTC tab 22.

The cap portion 5 has a rectangular end surface portion 51 for overlapping on the outer surface of the first side 3a of the frame portion 3 by way of the circuit board unit 4 (by sandwiching the circuit board unit 4) mounted on the circuit board unit mounting portion 37, and an elongated hollow portion 52 formed in continuous with the rectangular end surface portion 51 for fitting into one ends of the frame portion 3 and the battery cell 2.

On the end surface portion 51 of the cap portion 5, a plurality of terminal windows 53 through which the terminal contact portions 42 on the circuit board unit 4 face are provided. Moreover, on the top and bottom surfaces of the elongated hollow portion 52, a plurality of engaging holes 54 are provided for engaging with a plurality of the cap engaging claws 39 formed on the pair of top and bottom support portions 38, 38 of the frame portion 3.

Figure 3:
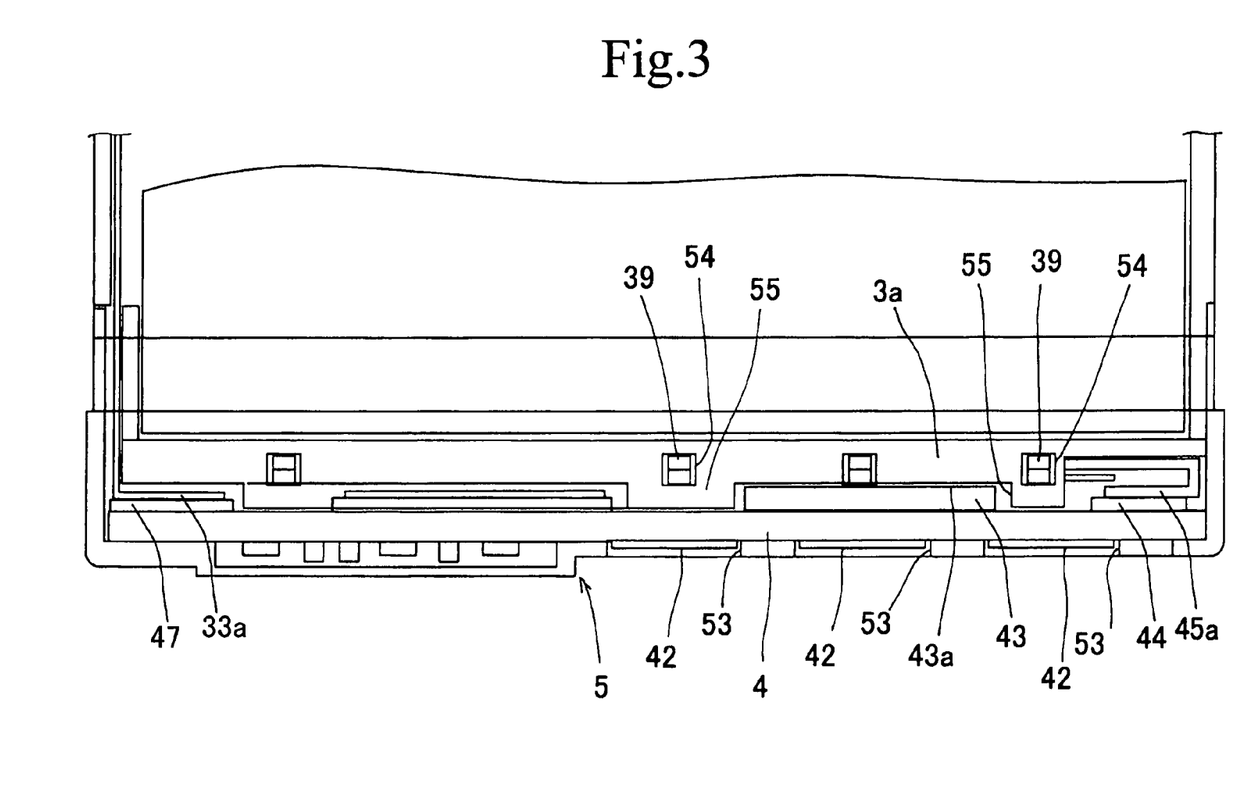
FIG. 3 is a cross-sectional view of a main portion.

Also, as shown in FIG. 2 and FIG. 3, the frame portion 3 has a plurality of protrusions 55 projecting toward the circuit board unit 4, which are provided on the pair of top and bottom cap support portions 38, 38. The protrusions 55 are formed so as to abut the position at which no electronic components and the like are mounted and the transfer mold 43 is to be sandwiched when a force is applied to the terminal contact portions 42 of the circuit board unit 4 by the corresponding terminals.

The outer packaging film 6 is made from synthetic resin such as polyethylene (PE), polyethylene terephthalate (PET), and polycarbonate (PC) in the form of sheet having a thickness of about 0.05 to 0.1 mm. The outer packaging film wraps the frame portion 3 after the battery cell 2 is placed inside the frame portion 3, the circuit board unit 4 and the like are mounted on the frame portion 3 and the cap portion 5 is placed. Then the outer packaging film 6 wraps the frame portion 3 to cover the front and the reverse surfaces of the battery cell 2 and integrally combine the battery cell 2, the frame portion 3 and the cap portion 5. It is to be noted that a reference number "6a" represents an adhered portion at the ends of the outer packaging film 6, and a reference number "56" represents a spacer to be mounted over the window portion 32 formed on the third side 3c of the frame portion 3.

Figure 4:
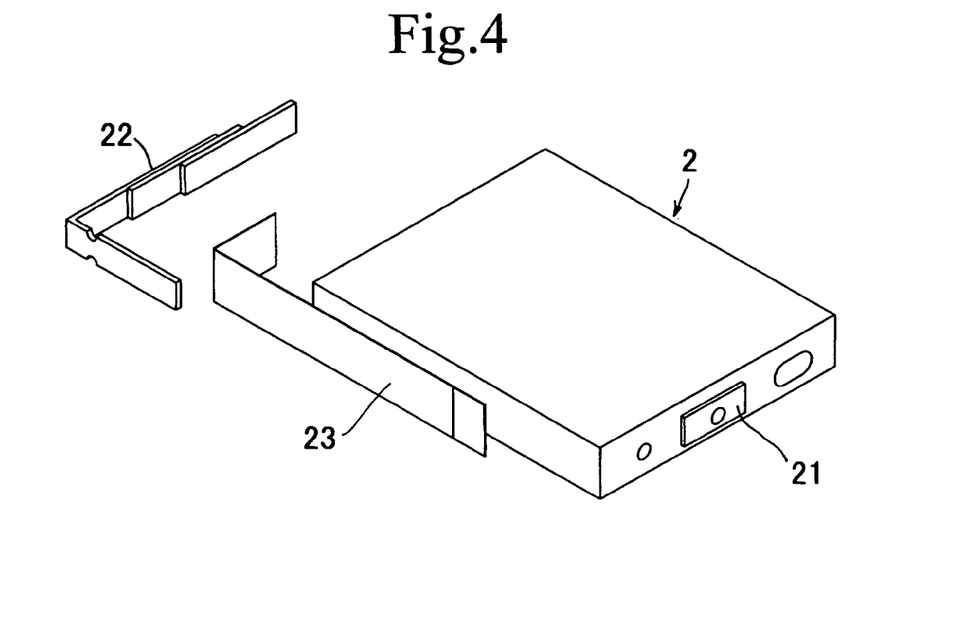
FIG. 4 is a diagram showing an assembling process of a battery pack.
Figure 5:
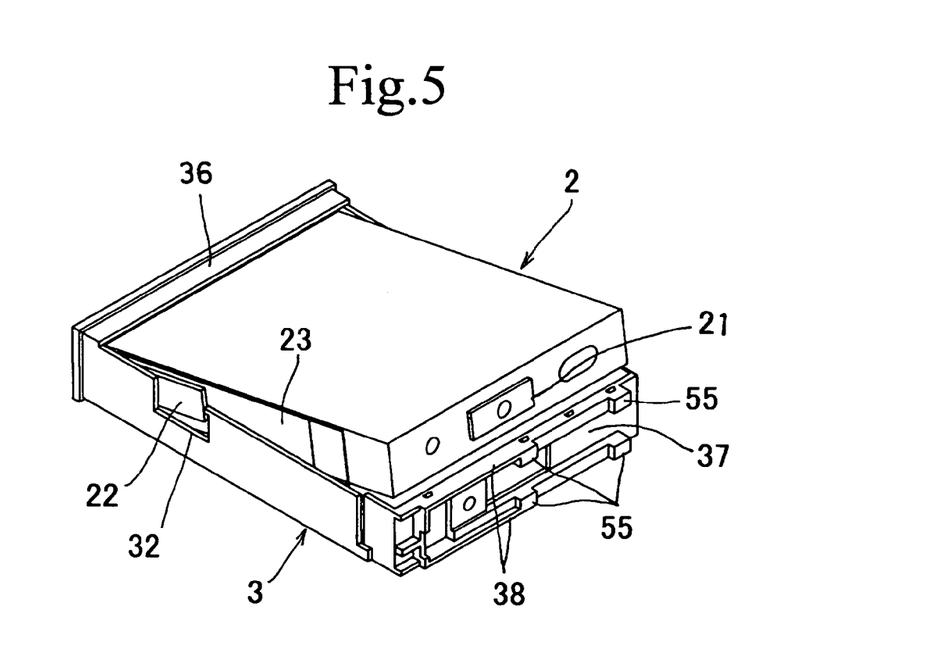
FIG. 5 is a diagram showing an assembling process of a battery back.
Figure 6:
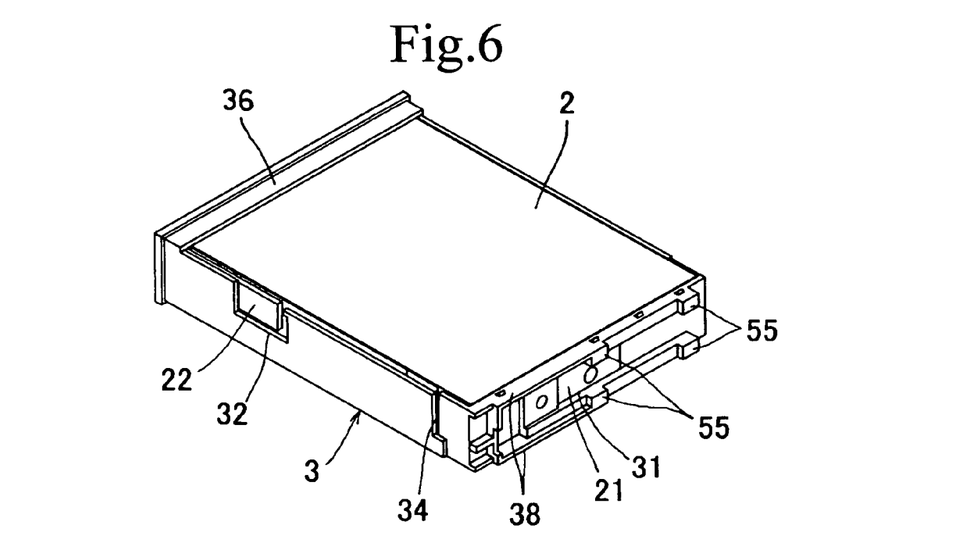
FIG. 6 is a diagram showing an assembling process of a battery back.

FIG. 4 to FIG. 9 show an example of assembling steps of the battery pack 1. Firstly, as shown in FIG. 4, the insulating paper 23 is attached onto the side surface of the battery cell 2 and subsequently one end side of the PTC tab 22 is welded to the cell's negative pole portion. Simultaneously, the other end side of the PTC tab 22 is held while aligning with the third side surface 2c of the battery cell 2. Then, as shown in FIG. 5, the battery cell 2 is placed in the frame portion 3, thereby placing the end portion of the second side surface 2b of the battery cell 2 between the flange-like protrusions 35, 36 that are formed on the frame portion 3 and permitting the cell's positive pole portion 21 to fit the cell's positive pole portion fitting window 31 of the frame portion 3, as shown in FIG. 6. And the end portion of the PTC tab 22 faces the window portion 32 of the frame portion 3.

Figure 7:
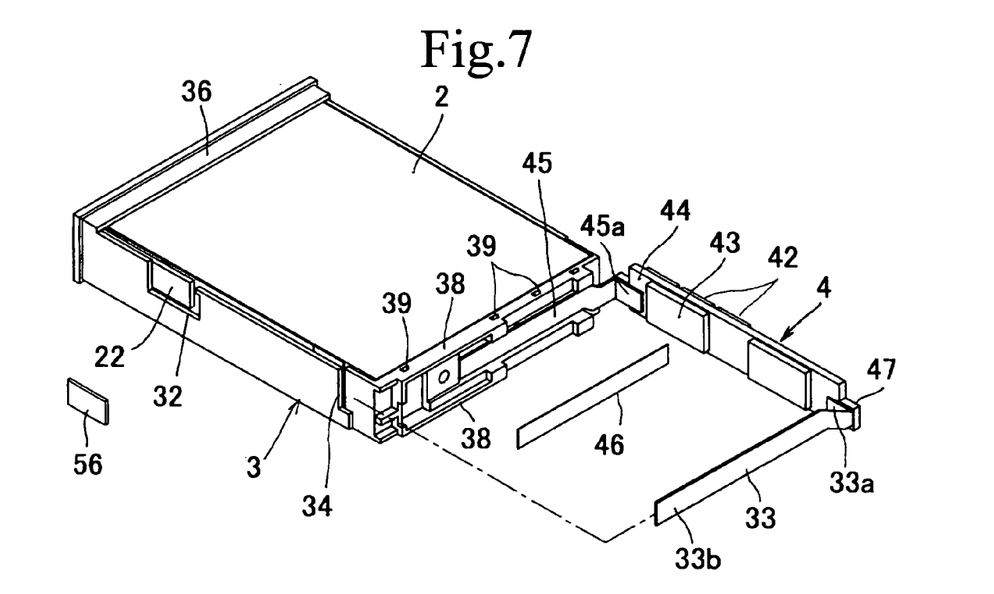
FIG. 7 is a diagram showing an assembling process of a battery back.

Subsequently, as shown in FIG. 7, the end portion of the shorter side of the L-shaped positive pole tab 45 is welded onto the cell's positive pole portion 21 and is mounted while the longer side thereof being aligned with the outer surface of the first side 3a of the frame portion 3, and the one end 45a of the shorter side of the L-shaped positive pole tab 45 is welded onto the terminal portion 44 at one end of the circuit board unit 4. Also, the longer side of the L-shaped negative pole tab 33 is set to be parallel with the first side 3a of the frame portion 3 and the longer side of the L-shaped positive pole tab 45 mounted on this first side 3a by welding one end 33a of the shorter side of the L-shaped negative pole tab 33.

Then, the shorter side of the positive pole tab 45 is bent at substantially 180 degrees so that the circuit board unit 4 overlaps on the outer surface of the first side 3a of the frame portion 3 by way of the insulating paper 46, thereby mounting the circuit board unit 4 to the circuit board unit mounting portion 37. In this case, the other end 33b of the negative pole tab 33 is inserted in to the frame portion 3 through the slit 34. As mentioned above, annealing treatment is already performed on the metal plate constituting the positive pole tab 45, thereby making it easy to be bent at substantially 180 degrees and thus preventing stress being applied onto the circuit board unit 4.

Figure 8:
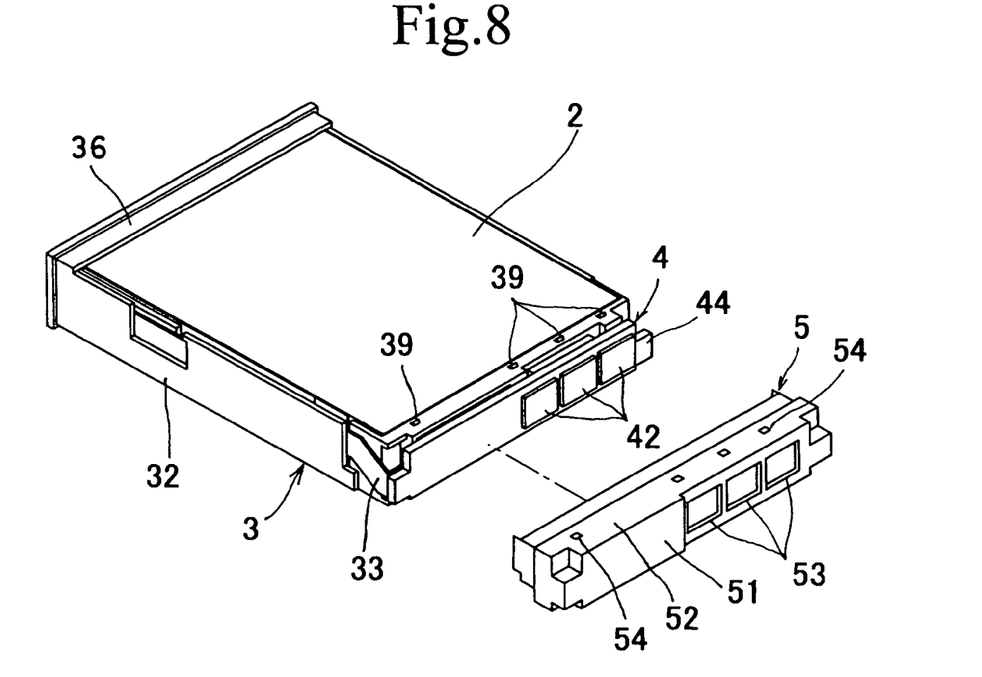
FIG. 8 is a diagram showing an assembling process of a battery back.
Figure 9:
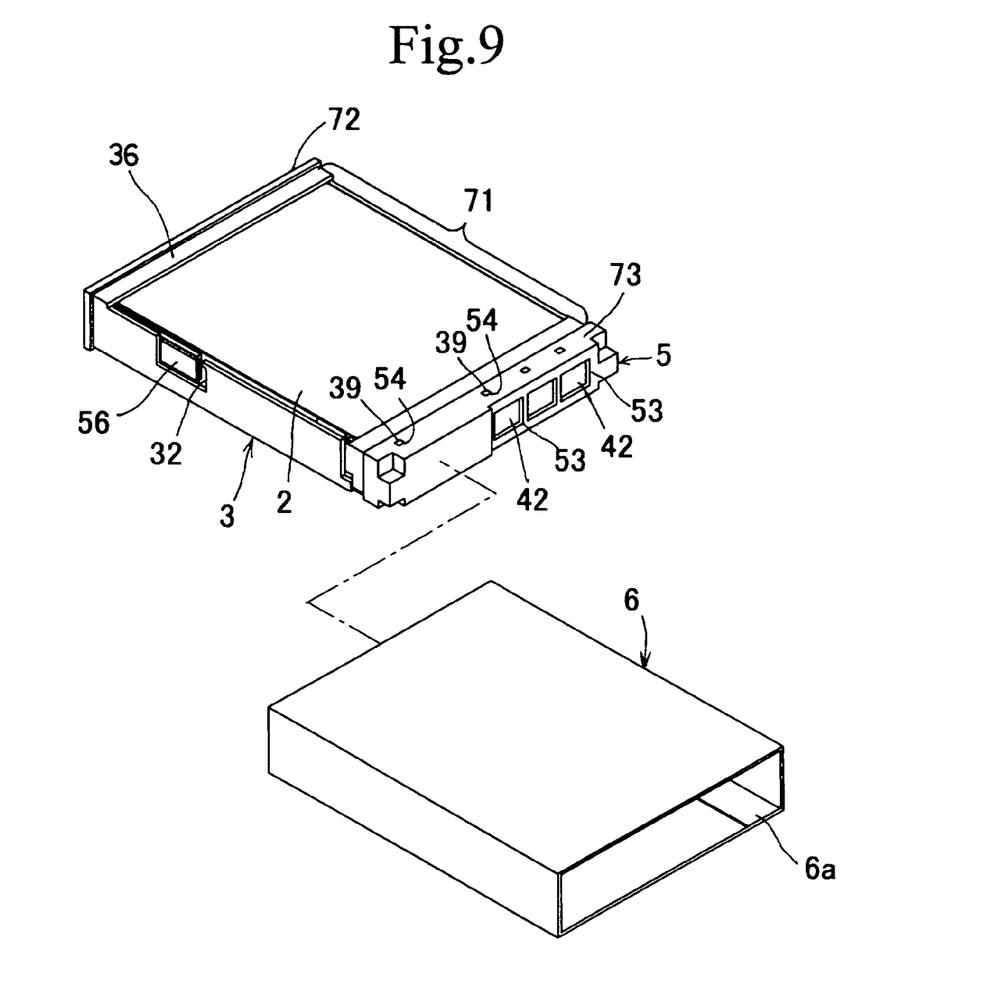
FIG. 9 is a diagram showing an assembling process of a battery back.

Then, as shown in FIG. 8, upon fitting the cap portion 5 onto one end of the frame portion 3 so as to cover the circuit board unit 4, a plurality of the cap engaging claws 39 formed on the pair of top and bottom cap supporting portions 38, 38 of the frame portion 3 engage with the claw engaging holes 54 formed in the elongated hollow portion 52 of the cap portion 5, thereby fixedly mounting the cap portion 5 onto the frame portion 3. And the other end 33b of the negative pole tab 33 inserted into the inside of the frame portion 3 through the slit 34 in the frame portion 3 is overlapped on the PTC tab 22 and is welded to the PTC tab 22 at the position that faces the window portion 32. As described above, by means of welding the negative pole tab 33 and the PTC tab 22 at the window portion 32 so that the negative pole tab 33 and the PTC tab 22 are overlapped each other after mounting the cap portion 5, it is possible to adjust the length of the negative pole tab 33 and the PTC tab 22, and avoid any stress to be applied to the circuit board unit 4 by way of the negative pole tab 33 due to variation in the welding position. The spacer 56 is mounted onto the window portion 32 after the negative pole tab 33 and the PTC tab 22 are welded. And finally, the outer packaging film 6 is wrapped by given at least more than one turn to adhere the end portions 6a so that it integrally combines the battery cell 2, the frame portion 3, the circuit board unit 4 and the cap portion 5, thereby completing the battery pack 1. The outer packaging film 6 to be wrapped may be formed previously in a ring shape as shown in FIG. 9 for ease of wrapping or it may be a flat sheet. Also, the outer packaging film 6 may be a single sheet or may be separated into a plurality of sheets. It is to be noted, as shown in FIG. 9, that an area 71 where the outer packaging film 6 is wrapped may be formed thinner than other areas 72, 73 where the outer packaging film 9 is not wrapped, by the amount equal to the thickness of the outer packaging film 6 to be wrapped, so that the overall outer surface of the battery pack 1 becomes substantially same level after the outer packaging film 6 is wrapped.

Finally, the embodiments and examples described above are only examples of the present invention. It should be noted that the present invention is not restricted only to such embodiments and examples, and various modifications, combinations and sub-combinations in accordance with its design or the like may be made without departing from the scope of the present invention.

What is claimed is:

1. A structure of a thin battery comprising:
a battery cell formed in a flat and approximately rectangular shape having top and bottom surfaces and four side surfaces, a positive pole formed on a first side surface and a negative pole formed on a second side surface which is opposite the first side surface;
a rectangular frame portion formed by only four side surfaces accommodating the four side surfaces of said battery cell, a height of a side surface of the frame portion, corresponding to the negative pole, being substantially equal to a height of the battery cell at its most inflated condition during charging or in a high temperature, and a height of a remaining three side surfaces of the frame portion being less than the height of the side surface corresponding to the negative pole;
a circuit board unit disposed on an outer side surface of said frame portion corresponding to the positive pole;
a cap portion mounted on one end of said frame portion and said battery cell so as to sandwich said circuit board unit with said outer side surface of said frame portion; and
an outer packaging film integrally covering a part of said cap portion, said top and bottom surfaces of said battery cell, and two of the side surfaces of said frame portion.

2. The structure of a thin battery according to claim 1, wherein;
an area, including both the frame portion and the cap portion, where the outer packaging film is wrapped is formed to be thinner relative to a height of an area where the outer packaging film is not wrapped by an amount corresponding to the thickness of the outer packaging film; and
at least one of the outer surfaces of the frame portion is formed to be higher than a side surface of the battery cell.

3. The structure of a thin battery according to claim 1, wherein said frame portion comprises:
a cell's positive pole portion fitting window formed on one side of said frame portion for fitting with a cell's positive pole portion projecting from a side surface of said battery cell; and
a circuit board unit mounting portion is provided on an outer surface of said one side of said frame portion for connecting said cell's positive pole portion.

4. The structure of a thin battery according to claim 1, wherein said cap portion comprises;
a rectangular end surface portion for sandwiching the circuit board unit mounted on the mounting portion with the frame portion; and
a tubular portion which is formed continuously with the rectangular end surface portion and has a fitting portion to be fitted to the outer circumference portion of one ends of the frame portion and the battery cell, and
a hollow portion is further provided at one of corner portion formed by the end surface portion and the tubular portion.

5. The structure of a thin battery according to claim 1, wherein;
said circuit board unit comprises a terminal contact portion facing outside from a terminal window provided on an end surface portion of said cap portion; and electronic components and a transfer mold for molding said electronic components at an inner surface facing to said frame portion;
said frame portion comprises protrusions projecting toward said circuit board unit side on a surface facing to said circuit board unit; and
said circuit board unit is assembled and fixed by sandwiching between said frame portion and said cap portion having a predetermined gap between an end of said transfer mold and said frame portion.

6. The structure of a thin battery according to claim 1, wherein;
the rectangular frame portion has a circuit board mounting portion on which the circuit board unit is set, the circuit board mounting portion is formed between a pair of cap portion supporting portions, projecting from upper and lower ends on the outer surface of a first side surface of the rectangular frame portion.

7. The structure of a thin battery according to claim 1, wherein;
the frame portion has a plurality of protrusions projecting toward the circuit board unit, the protrusions are formed so as to abut a position at which no electronic components are mounted.

8. A battery pack formed to be flat and rectangular shaped and having a first surface including a terminal contact portion and orthogonal to a main surface, a second surface opposite to the first surface, a first side surface orthogonal to the main surface, and a second side surface opposite to the first side surface, comprising:
a circuit board unit constructing said terminal contact portion;
a cap portion including said first surface having a terminal window capable of exposing said terminal contact portion to outside, and a tubular portion continuing with said first surface;
a flat and rectangular shaped battery cell having main and bottom surfaces and four side surfaces, a positive pole formed on a first side surface and a negative pole formed on a second side surface which is opposite the first side surface;
a frame portion in which a position where the main surface of the battery cell is facing is opened, and including only four side surfaces orthogonal to the main surface portion, wherein one surface is said second surface, a height of said second side surface of the frame portion, corresponding to the negative pole, being substantially equal to a height of the battery cell at its most inflated condition during charging or in a high temperature, and a height of a remaining three side surfaces of the frame portion being less than the height of the side surface corresponding to the negative pole; and
outer packaging film integrally covering the main and bottom surface of said battery cell and two side surfaces of said frame portion.

9. The battery pack according to claim 8, wherein;
area including both the frame portion and the cap portion where the outer packaging film is wrapped is formed to be thinner relative to a height of an area where the outer packaging film is not wrapped by an amount corresponding to the thickness of the outer packaging film.

10. The battery pack according to claim 8, wherein;
at least one of the outer surfaces of the frame portion is formed to be higher than a side surface of the battery cell.

11. The battery pack according to claim 6, wherein;
one end portion of the circuit board unit is connected to the other end portion of a positive pole tab in which one end portion of the positive pole tab is connected a cell positive pole portion of the battery cell;
the other end portion of the circuit board unit is connected to one end portion of an negative pole tab;

the other end portion of the negative pole tab and the other end portion of a PTC tab in which one end thereof is connected to a cell negative pole portion are connected with a welded portion; and the welded portion is provided at one of the first side surface and the second side surface.

12. The battery pack according to claim 11, wherein;
said welded portion is located inner side of a cutout portion provided at a side surface of the frame portion.

13. The battery pack according to claim 11, wherein;
said positive pole tab is formed to be L-shaped, in which a longer side thereof is connected to the cell positive pole portion of the battery cell and a shorter side thereof is connected to the one end of the circuit board unit.

14. The battery pack according to claim 11, wherein;
said positive pole tab is formed with a metal plate to which an annealing treatment is performed.

15. The battery pack according to claim 11, wherein;
said negative pole tab is formed to be L-shaped, in which a shorter side thereof is connected to the other end portion of the circuit board unit.

16. The battery pack according to claim 12, wherein;
the other end of the PTC tab in which one end portion thereof is welded to the cell negative pole portion of the battery cell and end portion of the longer side of the negative pole tab in which the shorter side is connected to the other end portion of the circuit board unit are overlapped at the cutout portion.

17. The battery pack according to claim 16, wherein;
the longer side of the negative pole tab is inserted into the frame portion through a slit provided at the side surface of the frame and is overlapped with the PTC tab within the cutout portion.

18. The battery pack according to claim 8, wherein;
a cap support portion to be inserted within the tubular portion of the cap portion is provided at the frame portion; and the cap portion is attached to the frame portion by inserting the cap support portion within the tubular portion of the cap portion.

19. The battery pack according to claim 18, wherein;
a cap portion engaging pawl and a pawl engaging hole are provided at the cap support portion and the tubular portion of the cap portion; and the cap portion engaging pawl and the pawl engaging hole engages to each other when the cap support portion is inserted within the tubular portion of the cap portion.

* * * * *